United States Patent
Cherian et al.

(10) Patent No.: US 7,558,915 B2
(45) Date of Patent: Jul. 7, 2009

(54) SYSTEM AND METHOD FOR UPDATING THE FIRMWARE OF A DEVICE IN A STORAGE NETWORK

(75) Inventors: Jacob Cherian, Austin, TX (US); Kai Yam Wu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 11/145,763

(22) Filed: Jun. 6, 2005

(65) Prior Publication Data
US 2006/0277328 A1    Dec. 7, 2006

(51) Int. Cl.
*G06F 12/00* (2006.01)
(52) U.S. Cl. ...................................................... 711/114
(58) Field of Classification Search ........................ None
See application file for complete search history.

(56) References Cited

U.S. PATENT DOCUMENTS

| 6,728,833 | B2* | 4/2004 | Pruett et al. ................. 711/114 |
| 7,191,437 | B1  | 3/2007 | Coatney et al. |
| 7,197,634 | B2  | 3/2007 | Kruger et al. |
| 7,231,493 | B2  | 6/2007 | Nguyen et al. |
| 2003/0005354 | A1* | 1/2003 | Kalman ......................... 714/7 |
| 2004/0019752 | A1* | 1/2004 | Burton et al. ............... 711/162 |

\* cited by examiner

*Primary Examiner*—Denise Tran
(74) *Attorney, Agent, or Firm*—Baker Botts L.L.P.

(57) ABSTRACT

A system and method is disclosed for managing access command transmitted to a storage controller during the period that a device coupled to the storage controller is undergoing a firmware update. The storage controller manages access commands directed to the storage controller so that the access command may be managed in a manner that does not disrupt the firmware update processor or the completion of the access command itself. The storage controller enters a guard mode in which the firmware of the storage controller intercepts commands directed to the device undergoing a firmware update. Depending on the characteristics of the access command, the data of the command may be generated from other drives in a redundant drive array or the command may be saved to a cache or journal for later processing.

19 Claims, 5 Drawing Sheets

SYSTEM AND METHOD FOR UPDATING THE FIRMWARE OF A DEVICE IN A STORAGE NETWORK

TECHNICAL FIELD

The present disclosure relates generally to computer networks and storage networks, and, more particularly, to a system and method for updating the firmware of a device in a storage network.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling systems of a network, including a storage network, may include software that is embedded in the device. The process of updating the firmware of the devices in a computer network can be problematic, especially when the devices of the network are geographically separate. Moreover, it is sometimes necessary to take a device offline during the period that its firmware is being updated. In the case of a storage drive, for example, the storage drive is removed from service during the period that the firmware is being updated. During the period that the storage drive is out of service, data cannot be written to or read from the storage drive. For many sensitive applications, however, taking a storage drive out of service, even for a short period, is not a viable option. As an alternative to removing a device from service, it may be possible to suspend or interrupt the firmware update process if a read or write command is directed to the storage drive. Interrupting the firmware update process, however, introduces the risk of corrupting the firmware of the device, which could render the device inoperable.

SUMMARY

In accordance with the present disclosure, a system and method is disclosed for managing access command transmitted to a storage controller during the period that a device coupled to the storage controller is undergoing a firmware update. The storage controller manages access commands directed to the device coupled to the storage controller so that the access command may be managed in a manner that does not disrupt the firmware update process on the couple device or the completion of the access command itself. The storage controller enters a guard mode in which the firmware of the storage controller intercepts commands directed to the device undergoing a firmware update. Depending on the characteristics of the access command, the data of the command may be generated from other drives in a redundant drive array or the command may be saved to a cache or journal for later processing.

The system and method disclosed herein is technically advantageous because it provides a technique for performing a firmware update without the necessity of taking a device offline for the firmware update. In this manner, as firmware updates become necessary, the firmware update can be completed without interrupting the transmission of access commands to the device undergoing the firmware update. Another technical advantage of the system and method disclosed herein is that the firmware update method disclosed herein is transparent to the operation of the issuer of the access command. The issuer of the access command does not appreciate that the affected device is experiencing a software update, and, in many cases, the access command is completed despite the ongoing software update process.

Another technical advantage of the system and method disclosed herein is that that the system and method is dependent on the details of the firmware update process in each of the devices coupled to the storage controller. Rather, the system and method disclosed herein is implemented through the firmware or other software of the storage controller and by the utility that updates the firmware on the coupled device. The storage controller manages data access commands without reference to the details of the firmware update process and by invoking the firmware update utility of the coupled devices. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
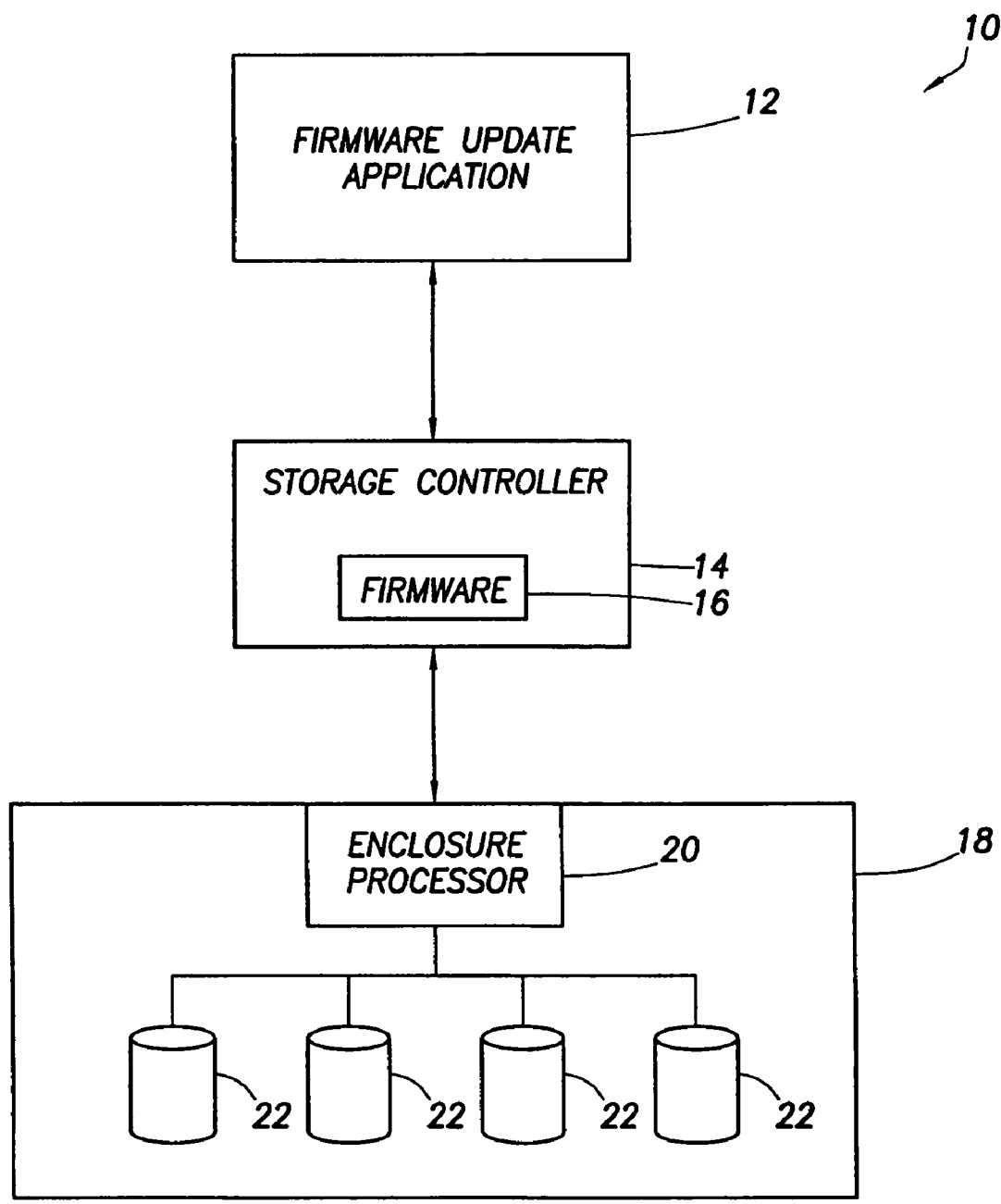
FIG. 1 is a diagram of a computer network.

FIG. 1 is a diagram of some elements of a computer network, which is indicated generally at 10. Computer network 10 includes a storage controller 14. Storage controller 14 includes a dedicated processor that includes firmware 16. Coupled to storage controller 14 is a storage enclosure 18, which includes a storage enclosure processor 20 and a number of drives or disks 22. Drives 22 may be organized into one or more arrays of drives that are managed according to a fault-tolerant storage methodology, such as RAID. The terms disk and drive are used interchangeably herein. It should be recognized that the network architecture of FIG. 1 is an example and that the method and system disclosed herein may also be used in conjunction with other network architectures, including network architectures that include multiple storage enclosure, each having multiple drives. Although the drives of FIG. 1 are depicted as being included in a storage enclosure, the drives need not be included within a storage enclosure.

Storage enclosure processor 20 and each of the drives 22 include firmware embedded on the dedicated processors of the device. Computer network 10 also includes a firmware update application 12. Firmware update application 12 may reside in a host computer or server that is coupled to the storage controller. Although firmware update application 12 is depicted in FIG. 1 as being external to storage controller 14, firmware update application 12 may reside within the storage controller itself. Because firmware update processes for the various drives 22 and storage enclosure processors 20 that may populate a network are not standardized, it is impractical to build a firmware update utility into the firmware 16 of storage controller 14. Instead, a separate firmware update utility 12 is provided that is operable to initiate the commands necessary to update the firmware of the drives 22 or storage enclosure processors 20. The firmware 16 of the storage controller 14 provides a gatekeeping function. The firmware 16 of the storage controller 14 passes commands from the firmware update utility 12 to the device whose firmware is being updated. The firmware 16 of the storage controller 14 also modifies the operation of the network and the device during the period that the firmware of the device is being updated.

It should be recognized that the system and method disclosed herein is not limited to the example of the internal RAID controller configuration depicted in FIG. 1. Rather, the system and method disclosed herein may also be employed in storage networks that involve the use of an external RAID controller. The elements of the system and method disclosed herein, including the firmware update application 12, the controller firmware 16, and the coupled devices (drives and storage enclosure processor) may be separated from one another and included in multiple devices or included with one another in one or more devices.

Figure 2:
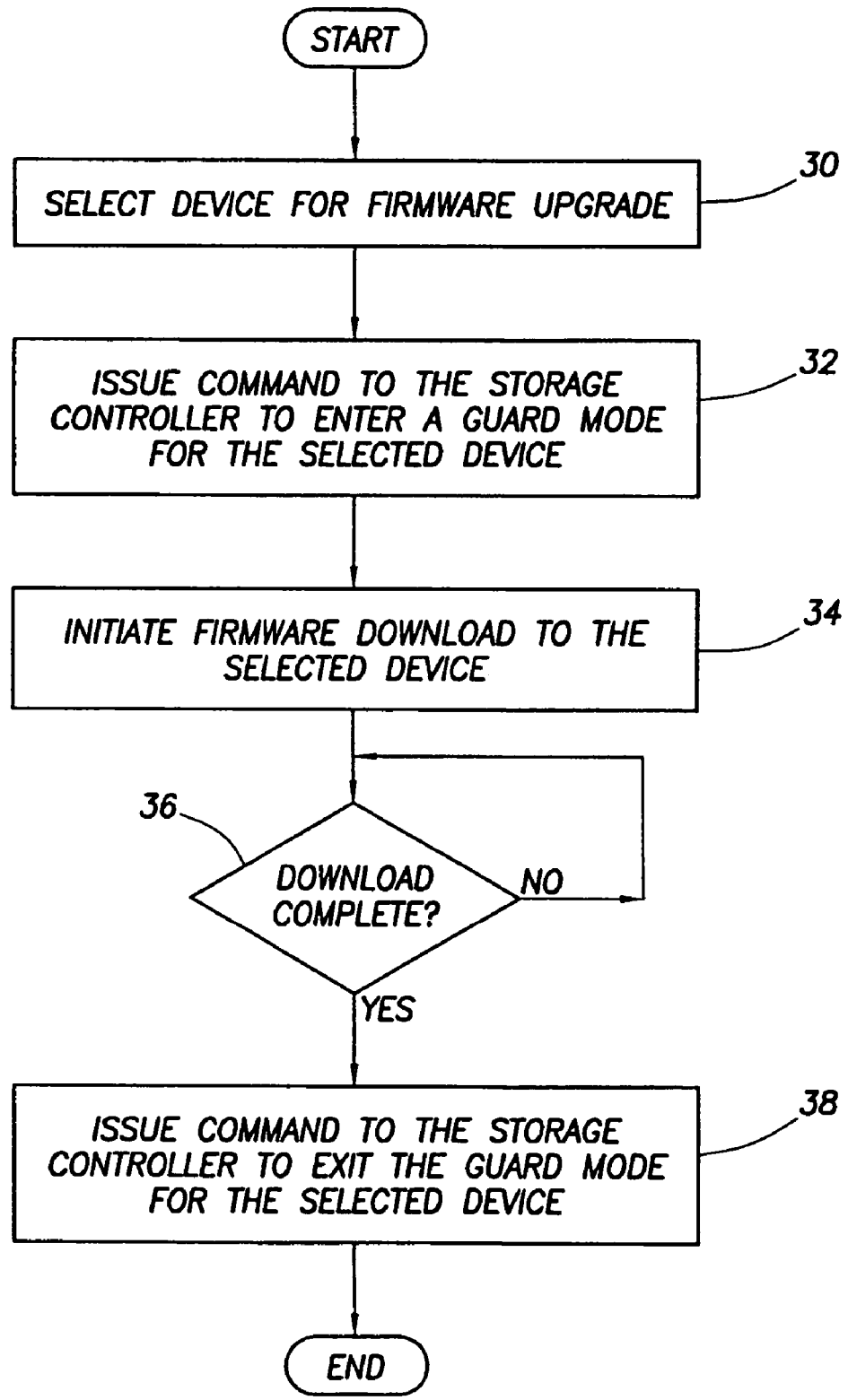
FIG. 2 is a flow diagram of a method by which the firmware update utility sets a guard mode in the firmware of the storage controller.

Shown in FIG. 2 are a series of method steps by which the firmware update utility sets a guard mode in the firmware of the storage controller. At step 30, the firmware update utility selects a device for a firmware upgrade. The selection of a device could be initiated on the basis of one of several factors, including a signal or indicator received by the device itself or at the initiation of the user. The selected device may comprise a drive, a storage enclosure processor, or another device within the storage subsystem that includes embedded firmware. At step 32, the firmware update utility issues a command to the storage controller to cause the storage controller to enter a guard mode. When the storage controller is in a guard mode, the storage controller manages the handling of access commands sent to the selected device during the period that the firmware update is in process. Following the placement of the storage controller in a guard mode, the firmware update utility initiates at step 34 a firmware download to the selected device. Once it is determined at step 36 that the download to the selected device is complete, a command is issued to the storage controller at step 38 to cause the storage controller to exit the guard mode. The terms application and utility are used interchangeably herein.

Figure 3:
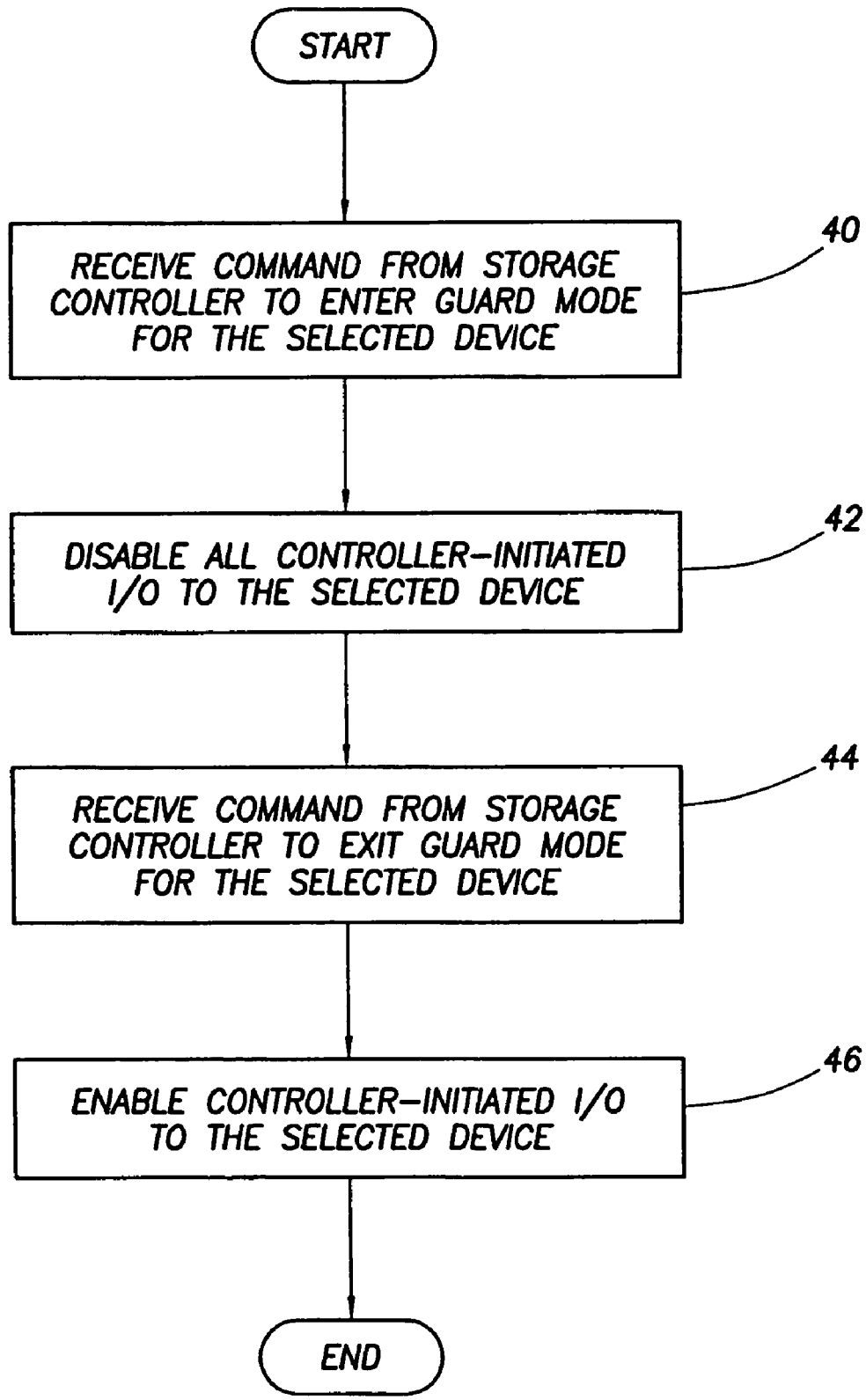
FIG. 3 is a flow diagram of a method by which the storage controller enters and exits a guard mode.

Shown in FIG. 3 are a series of method steps by which the storage controller enters and exits a guard mode. At step 40, the storage controller receives a command to enter guard mode. As described above, the storage controller enters guard mode immediately before a firmware update begins for one of the devices coupled to and managed by the storage controller. After the storage controller enters guard mode, the storage controller at step 42 sets a flag to prevent or disable all controller initiated command to the selected device. Once the guard command is received and the flag is set, the storage controller itself is disabled from initiating configuration, status, or other commands directed to the selected device. At some later point at step 44, the storage controller receives a command to exit the guard mode with respect to the selected device. Following the receipt of such command, the storage controller next enables the transmission of controller-initiated commands to the selected device.

Figure 4:
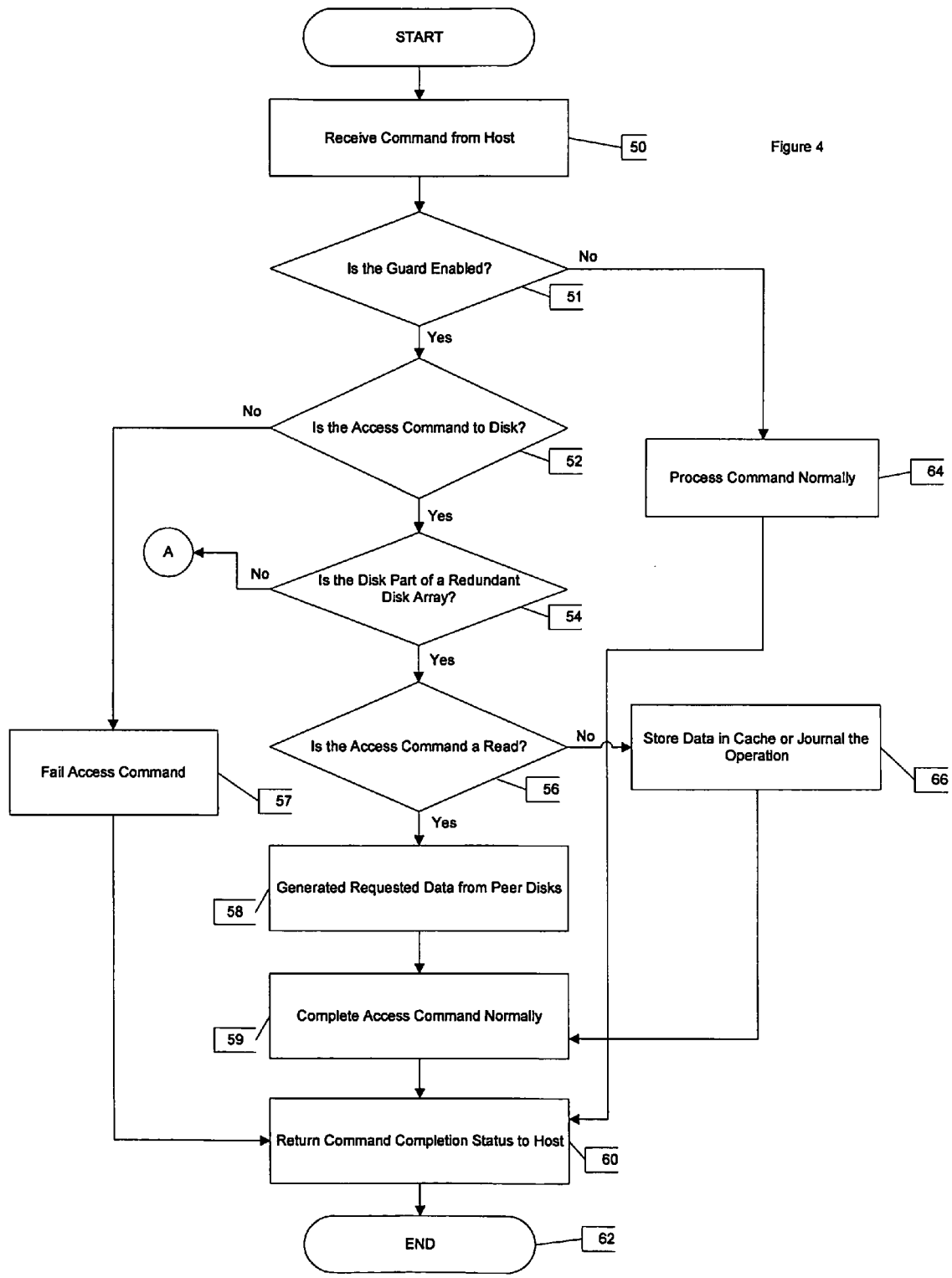
FIG. 4 is a flow diagram of a method for managing access commands to a drive array during a firmware update process.
Figure 5:
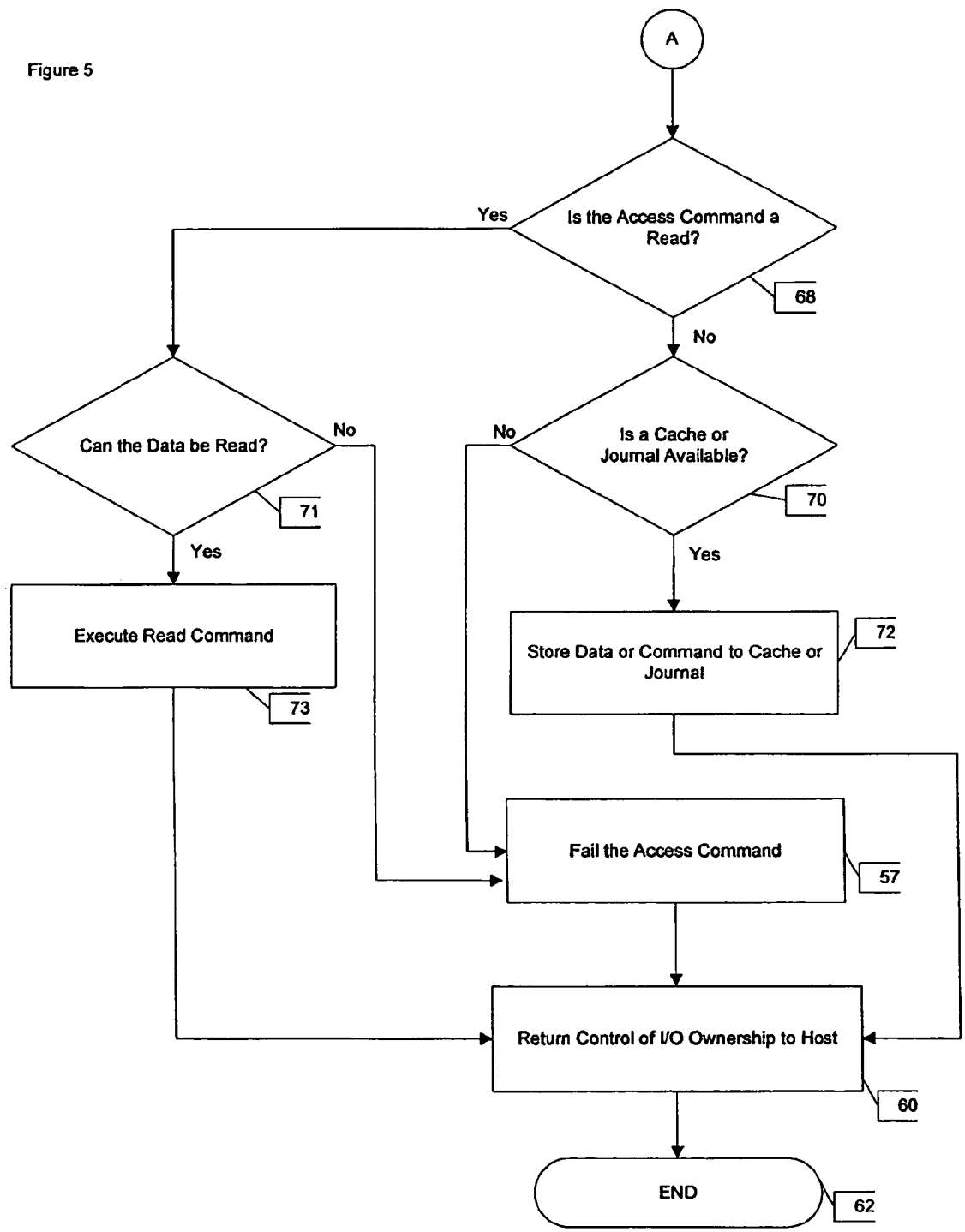
FIG. 5 is a flow diagram of a method for managing access commands to a non-redundant drive array during a firmware update process.

Shown in FIGS. 4 and 5 are flow diagrams of a series of method steps for recognizing a guard command at a storage controller and managing access commands to a selected device such as a drive or a storage enclosure processor to prevent the device from being marked as failed during the period that the firmware of the selected device is being updated. At step 50 of FIG. 4, an access command from a host is received at the storage controller. At step 51, the storage controller determines if guard status is enabled for any drive or storage enclosure processor that is communicatively coupled to the storage controller. If the guard status is not enabled in the storage controller, the command is processed normally at step 64 and control of additional access commands is returned to the host at step 60. If it is determined at step 51 that guard status is enabled for at least one drive or storage enclosure processor that is communicatively coupled to the storage controller, the storage controller next determines if the access command is directed to a disk. If it is determined at step 52 that the access command is not directed to a disk, the access command is likely directed to a storage enclosure processor, and the access command is failed at step 57. If the guard is enabled for a disk or storage enclosure processor, access commands not directed to a disk are failed at step 57.

If the access command is directed to a disk, it is next determined at step 54 if the disk is part of an array in which the data is stored on the array according to a redundant storage methodology, such as one of the redundant RAID storage levels, including RAID Level 5 as one example. If the access command is directed to a redundant array, it is next determined at step 56 if the access command is a read command. If it is determined that the access command is a read command, the requested data of the read command is generated from the peer disks of the redundant array at step 58, and control of additional access commands is returned to the host at step 60. In redundant storage array, the data of a single failed or otherwise unavailable disk can be recreated on the basis of the content of the remaining disks of the array. Returning to step 56, if it is determined that the access command is not a read command, the write command is written at step 66 to a journal or cache. The transfer of the write command to a journal or cache may involve writing the data of the write command to the cache or recording the command in a journal for later execution. If a cache or a journal is not available for the write command, the command is failed. Following the execution of step 66, control of additional access commands is returned to the host at step 60. A cache or journal may be used to temporarily store the data of the command or the command itself during the period that the target disk is undergoing a firmware update. When the firmware update is complete the data of the command is written to the disk.

Returning to step 54, if the disk is not part of a redundant array, such as a RAID Level 0 array, the flow diagram continues at point A in FIG. 5. For an access command directed to a non-redundant array, it is first determined at step 68 if the access command is a read command. If it is determined at step 68 that the access command is a read command, then it is next determined at step 71 if the target of the read command is available. The target of the read command is available, for example, if the read command is wholly directed to a disk of the array that is not undergoing a firmware update. If the target of the read command is available, the read command is executed at step 73 and control of additional access commands is returned to the host at step 60. If the target of the read command is not available, the access command is failed at step 57 and control of additional access commands is returned to the host at step 60.

Returning to step 68, if the access command is not a read, it is next determined at step 70 if a cache or journal is available to receive the data or the command directed to the drive. If a cache or journal is available, the data of the write command or the write command itself is written to the cache or journal. As described above with respect to redundant arrays, a cache or journal may be used to temporarily store the data of the command or the command itself during the period that the target disk is undergoing a firmware update. Following step 72, control of additional access commands is returned to the host at step 60. If a cache or journal is not available, the access command is failed at step 57, and control of additional access commands is returned to the host at step 60.

As a result of the system and method disclosed herein, it is not necessary to fail every access command that is directed to a drive that is undergoing a firmware update. Instead, the storage controller is able to manage the handling of the command according to the characteristics of the access command and the drive array that includes the affected drive. Although there are some access commands that must be failed due to the nature of the command and the characteristics of the drive array that includes the affected drive, there are other access commands that can be processed in a manner that is transparent to the host device that issued the access command. Thus, the host is able in some circumstances to retrieve data from or transmit data to the drive that is undergoing a firmware update process. Because the firmware update process can be handled concurrently with access to the drives of the drive array, the drive array need not be disabled or failed in its entirety as part of the firmware update process, thereby maintaining both the performance capabilities and availability of the drive array. In addition, the system and method disclosed herein results in the failing of some access commands as an alternative to having the drive or storage enclosure processor being identified as failed. If a drive or drive array is identified as failed, the recover process may be significantly longer. The system and method disclosed herein, however, provide an alternative to failing a drive when a drive or storage enclosure processor is temporarily unavailable due to a firmware update.

Although the present disclosure has been described in detail, it should be understood that various changes, substitutions, and alterations can be made hereto without departing from the spirit and the scope of the invention as defined by the appended claims.

What is claimed is:

1. A method for managing data access commands directed to at least one storage drive of a drive array during a period that a firmware update process is being performed on the at least one storage drive, wherein the drive array is coupled to a storage controller comprising the steps of:

upon initiation of the firmware update process, issuing a command from a firmware update utility to the storage controller to enter a guard period; wherein the firmware update utility is not built into the storage controller;

entering the guard period in a firmware handling utility stored on the storage controller to indicate that the at least one storage drive coupled to the storage controller is undergoing the firmware update process;

initiating the firmware update process on the at least one storage drive coupled to the storage controller, wherein the firmware update process is initiated by the firmware update utility;

receiving a data access command at the storage controller;

determining if the data access command is directed to the at least one storage drive that is undergoing the firmware update process;

if it is determined that the data access command is directed to the at least one storage drive that is undergoing the firmware update process, processing the data access command in a manner that is transparent to an issuer of the data access command;

upon completion of the firmware update process, issuing a command from the firmware update utility to the storage controller to leave the guard period; and leaving the guard period in the firmware handling utility on the storage controller.

2. The method of claim 1, wherein the step of processing the data access command in a manner that is transparent to the issuer of the access command comprises, in the case of a read command, generating the data requested by the read command from redundant data in the drive array.

3. The method of claim 2, wherein the redundant data in the drive array is stored according to a RAID storage methodology.

4. The method of claim 1, wherein the step of processing the data access command in a manner that is transparent to the issuer of the access command comprises, in the case of a write command, writing the data of the write command to a cache associated with the storage controller.

5. The method of claim 1, wherein the step of processing the data access command in a manner that is transparent to the issuer of the access command comprises, in the case of a read command, generating the data requested by the read command from redundant data in the drive array; and in the case of a write command, writing the data of the write command to a cache associated with the storage controller.

6. The method of claim 5, wherein the redundant data in the drive array is stored according to a RAID storage methodology.

7. A storage controller, comprising:
a processor;
a firmware handling utility, wherein the firmware handling utility is operable to manage data access commands directed to a drive array coupled to the storage controller such that data access commands issued to at least one drive undergoing a firmware update are handled in a manner that is transparent to an issuer of the data access commands,
wherein the firmware handling utility is operable to receive a command to enter a guard period to indicate that the at least one drive accessible through the storage controller is undergoing the firmware update and receive a command to leave the guard period;
wherein the firmware handling utility receives the command to enter the guard period and the command to leave the guard period from a firmware update utility;
wherein the firmware update utility initiates the firmware update; and
wherein the firmware update utility is not built into the storage controller.

8. The storage controller of claim 7, wherein the firmware handling utility is operable to identify whether a data access command received by the storage controller is directed to a drive of the drive array that is undergoing a firmware update.

9. The storage controller of claim 8, wherein the firmware handling utility is operable, in the case of a read command directed to a drive of a redundant drive array that is undergoing a firmware update, to generate the requested data of the read command from the other drives of the drive array.

10. The storage controller of claim 8, wherein the firmware handling utility is operable, in the case of a read command directed to a drive of a redundant RAID array that is undergoing a firmware update, to generate the requested data of the read command from the other drives of the drive array.

11. The storage controller of claim 8, wherein the firmware handling utility is operable, in the case of a write command directed to a drive of the drive array that is undergoing a firmware update, to write the data of the write command to a cache associated with the storage controller.

12. The storage controller of claim 8,
wherein the firmware handling utility is operable, in the case of a read command directed to a drive of a redundant drive array that is undergoing a firmware update, to generate the requested data of the read command from the other drives of the drive array; and
wherein the firmware handling utility is operable, in the case of a write command directed to a drive of the drive array that is undergoing a firmware update, to write the data of the write command to a cache associated with the storage controller.

13. A method for identifying and managing data access commands received by a storage controller during a period in which at least one storage drive coupled to the storage controller is undergoing a firmware update process, comprising steps of:
upon initiation of the firmware update process, issuing a command from a firmware update utility to the storage controller to enter a guard period; wherein the firmware update utility is not built into the storage controller;
entering the guard period in a firmware handling utility stored on the storage controller to indicate that the at least one storage drive coupled to the storage controller is undergoing the firmware update;
initiating the firmware update on the at least one storage drive coupled to the storage controller, wherein the firmware update is initiated by the firmware update utility;
determining if a received data access command is directed to the at least one storage drive that is undergoing the firmware update;
if the received data access command is directed to the at least one storage drive that is undergoing the firmware update, handling the data access command in a manner that is transparent to an issuer of the data access command;
upon completion of the firmware update process, issuing a command from the firmware update utility to the storage controller to leave the guard period; and
leaving the guard period in the firmware handling utility on the storage controller.

14. The method of claim 13, wherein the step of handling the data access command in a manner that is transparent to the issuer of the data access command comprises the steps of, in the case of a read command,
determining if a drive is included in a redundant drive array; and
if the drive is included in the redundant drive array, generating the data requested by the read command from the other drives of the redundant drive array.

15. The method of claim 13, wherein the step of handling the data access command in a manner that is transparent to the issuer of the data access command comprises the steps of, in the case of a write command, writing the write command to a journal associated with the storage controller; and executing the write command in the journal following completion of the firmware update on the drive.

16. The method of claim 13, wherein the step of handling the data access command in a manner that is transparent to the issuer of the data access command comprises the steps of, in the case of a write command,
writing data of the write command to a cache associated with the storage controller; and
transferring the contents of the cache to the drive following completion of the firmware update on the drive.

17. The method of claim 13, further comprising a step of failing the data access command if the data access command cannot be handled in a manner that is transparent to the issuer of the data access command.

18. The method of claim 13,
wherein the step of handling the data access command in a manner that is transparent to the issuer of the data access command comprises the steps of, in the case of a read command,
determining if a drive is included in a redundant drive array; and
if the drive is included in the redundant drive array, generating the data requested by the read command from the other drives of the redundant drive array; and
wherein the step of handling the data access command in a manner that is transparent to the issuer of the data access command comprises the steps of, in the case of a write command,
writing the write command to a journal associated with the storage controller; and executing the write command in the journal following completion of the firmware update on the drive.

19. The method of claim 13,
wherein the step of handling the data access command in a manner that is transparent to the issuer of the data access command comprises the steps of, in the case of a read command,
determining if a drive is included in a redundant drive array; and
if the drive is included in the redundant drive array, generating the data requested by the read command from the other drives of the redundant drive array; and wherein the step of handling the data access command in a manner that is transparent to the issuer of the data access command comprises the steps of, in the case of a write command,
writing the write command to a cache associated with the storage controller; and
transferring the contents of the cache to the drive following completion of the firmware update on the drive.

\* \* \* \* \*